(12) United States Patent
Yu

(10) Patent No.: US 6,409,630 B1
(45) Date of Patent: Jun. 25, 2002

(54) POWER OFF UPSHIFT CONTROL METHOD FOR AUTOMATIC TRANSMISSION

(75) Inventor: Pyung-Hwan Yu, Suwon (KR)

(73) Assignee: Hyundai Motor Co., Seoul (KR)

( * ) Notice: Subject to any disclaimer, the term of this patent is extended or adjusted under 35 U.S.C. 154(b) by 29 days.

(21) Appl. No.: 09/653,257

(22) Filed: Aug. 31, 2000

(30) Foreign Application Priority Data

Oct. 29, 1999 (KR) .............................................. 99-47438

(51) Int. Cl.⁷ ................................................. F16H 61/04
(52) U.S. Cl. ....................................... 477/154; 477/155
(58) Field of Search ................................. 477/154, 155; 701/51

(56) References Cited

U.S. PATENT DOCUMENTS 5,157,608 A * 10/1992 Sankpal et al. ........... 364/424.1
5,168,449 A * 12/1992 Benford .................... 364/424.1
5,197,006 A * 3/1993 Saitou et al. ............. 364/424.1

* cited by examiner

*Primary Examiner*—Dirk Wright
(74) *Attorney, Agent, or Firm*—Birch, Stewart, Kolasch & Birch, LLP

(57) ABSTRACT

A power Off upshift control method for an automatic transmission includes the steps of determining, during an upshift operation, if power Off upshifting is taking place; determining if power Off upshift conditions are satisfied; measuring a hydraulic pressure response time, establishing a maximum duty value for preventing forced shifting, and calculating the hydraulic pressure response time when the maximum duty value changes to 100% duty, these processes being performed if the power Off upshift conditions are satisfied; calculating a shift finish point after the hydraulic pressure response time is calculated; determining if the shift finish point corresponds to an actual shift finish point; and setting the maximum duty value at 100% duty if the shift finish point corresponds to the actual shift finish point.

5 Claims, 4 Drawing Sheets

POWER OFF UPSHIFT CONTROL METHOD FOR AUTOMATIC TRANSMISSION

BACKGROUND OF THE INVENTION (a). Field of the Invention

The present invention relates to a power Off upshift control method for an automatic transmission, and more particularly, to a control method for an automatic transmission that prevents under-shooting and tie-up while performing power Off upshift control.

(b). Description of the Related Art

Shifting is generally performed in an automatic transmission in accordance with changes in throttle valve opening. That is, throttle valve opening is varied through driver manipulation of the accelerator pedal, and such changes in throttle valve opening correspond to different locations on a shift pattern such that shifting is performed.

The different types of shift control include power On/Off upshifting and power On/Off downshifting. Power On upshifting and power On downshifting refer to shifting taking place when the driver depresses the accelerator pedal, while power Off upshifting and downshifting refer to shifting when the accelerator pedal is released.

If the accelerator pedal is released in a state approaching or at full throttle valve opening, lift-foot-up shifting is effected in which an upshift line on the shift pattern is crossed such that shifting into a higher speed is performed. That is, with reference to FIG. 1, if throttle valve opening is changed from 100% to 0% (i.e., if the accelerator pedal is released by the driver after being fully depressed), hydraulic pressure control occurs such that a state as close to neutral as possible is realized. At this time, a drop in engine rpm NE1 occurs as engine rpm NE1 come close to corresponding to turbine rpm NT1, and if a shift finish point is reached, duty control is completed such that hydraulic pressure is increased, thereby realizing upshifting.

In application, however, during power Off upshifting, both changes in engine rpm drop characteristics (according vehicle driving state and load) occur, and clutch timing and solenoid valve quality problems arise. With regard to the change in engine rpm drop characteristics, this causes a change also in the speed at which turbine rpm decrease. If such reductions occur too quickly (before the shift finish point) under shooting occurs, while if the reductions in rpm occur too slowly (after the shift finish point) tie-up occurs. The problems of under shooting and tie-up worsen as a result of either too slow or fast hydraulic pressure response times.

In the prior art control method as described above, during lift-foot-up shifting, as a result of tie-up and under shooting, which are caused by a reduction in turbine rpm occurring because of a drop in engine rpm, trouble in shift synchronization occurs. This results in the generation of shift shock, reducing ride comfort.

SUMMARY OF THE INVENTION

The present invention has been made in an effort to solve the above problems.

It is an object of the present invention to provide a power Off upshift control method for an automatic transmission which varies a shift finish point according to changes in turbine rpm during power Off upshifting such that shifting occurs always at the shift finish point.

To achieve the above object, the present invention provides a power Off upshift control method for an automatic transmission comprising the steps of determining, during an upshift operation, if power Off upshifting is taking place; determining if power Off upshift conditions are satisfied; measuring a hydraulic pressure response time, establishing a maximum duty value for preventing forced shifting, and calculating the hydraulic pressure response time when the maximum duty value changes to 100% duty, these processes being performed if the power Off upshift conditions are satisfied; calculating a shift finish point after the hydraulic pressure response time is calculated; determining if the shift finish point corresponds to an actual shift finish point; and setting the maximum duty value at 100% duty if the shift finish point corresponds to the actual shift finish point.

According to a feature of the present invention, the power Off upshift conditions include a throttle valve opening less than or equal to 0.65V or an idle switch being in an On state, and an ATF temperature being greater than or equal to 0° C.

According to another feature of the present invention, if the power Off upshift conditions are not satisfied, the upshift control method is placed in a normal operating mode such that the shift finish point is not altered according to turbine rpm.

According to yet another feature of the present invention, the shift finish point is calculated by detecting turbine rpm Nt for a predetermined number of cycles to obtain an average turbine rpm rate of change NTAV; calculating a target turbine rpm NTob, the target turbine rpm NTob being calculated by multiplying No by a target gear ratio (NTob=No×target gear ratio), where No is a turbine input rpm Nt divided by the gear ratio; and determining the shift finish point by multiplying the average turbine rpm NTAV by the hydraulic pressure response time TPR plus the target turbine rpm NTob [i.e., (NTAV×TPR)+NTob=SFP].

According to still yet another feature of the present invention, the average turbine rpm rate of change NTAV is obtained by detecting turbine rpm Nt for each cycle (20 ms) for four cycles to determine a rate of change of turbine rpm (NT1–NT4), then dividing this rate of change of turbine rpm (NT1–NT4) by four cycles to obtain the average turbine rpm rate of change NTAV.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
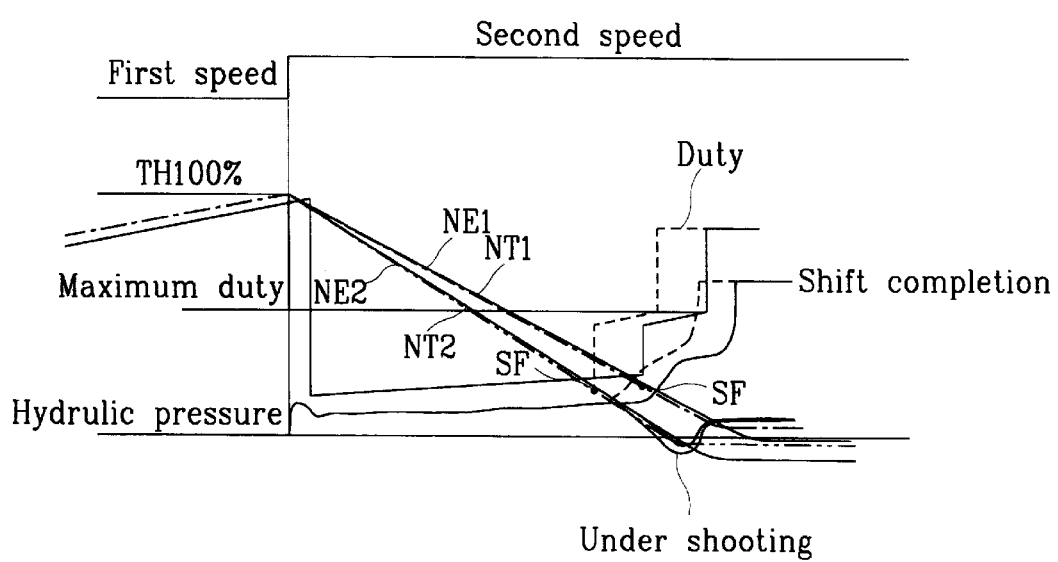
FIG. 1 is a shift pattern diagram for power Off upshifting according to the prior art shift control method.
Figure 2:
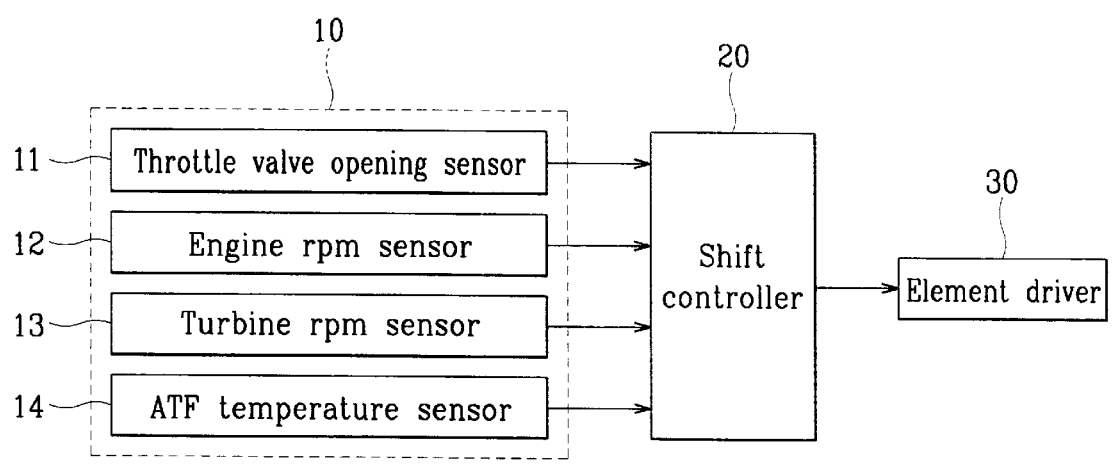
FIG. 2 is a block diagram of a shift control system to which the present invention is applied.

FIG. 2 shows a block diagram of a shift control system to which the present invention is applied.

The shift control system includes a drive state detector 10, a shift controller 20, and an element driver 30. The drive state detector 10 includes various sensors for detecting changes in a driving state of the vehicle. The shift controller 20 receives signals from the drive state detector 10 and establishes a maximum duty value which does not effect forced shifting. Further, in a state where a hydraulic pressure response time is calculated when the maximum duty changes to 100% duty, if signals corresponding to power Off upshift are detected, the shift controller 20 determines if power Off upshift conditions are satisfied and calculates a shift finish point according to turbine rpm. The shift controller 20 then sets an actual shift finish point as the calculated shift finish point. The element driver 30 is controlled by signals output by the shift controller 20.

The drive state detector 10 includes a throttle valve opening sensor 11 for detecting an opening degree of a throttle valve and outputting a corresponding signal, the throttle valve being indexed with a driver-operated accelerator pedal; an engine rpm sensor 12 for detecting an rpm of a crankshaft of an engine and outputting a corresponding signal; a turbine rpm sensor 13 for detecting an rpm of a turbine shaft of a torque converter and outputting a corresponding signal, the turbine shaft of the torque converter being connected to an input shaft of a transmission; and an automatic transmission fluid (ATF) temperature sensor 14 for detecting a temperature of automatic transmission fluid.

Figure 3:
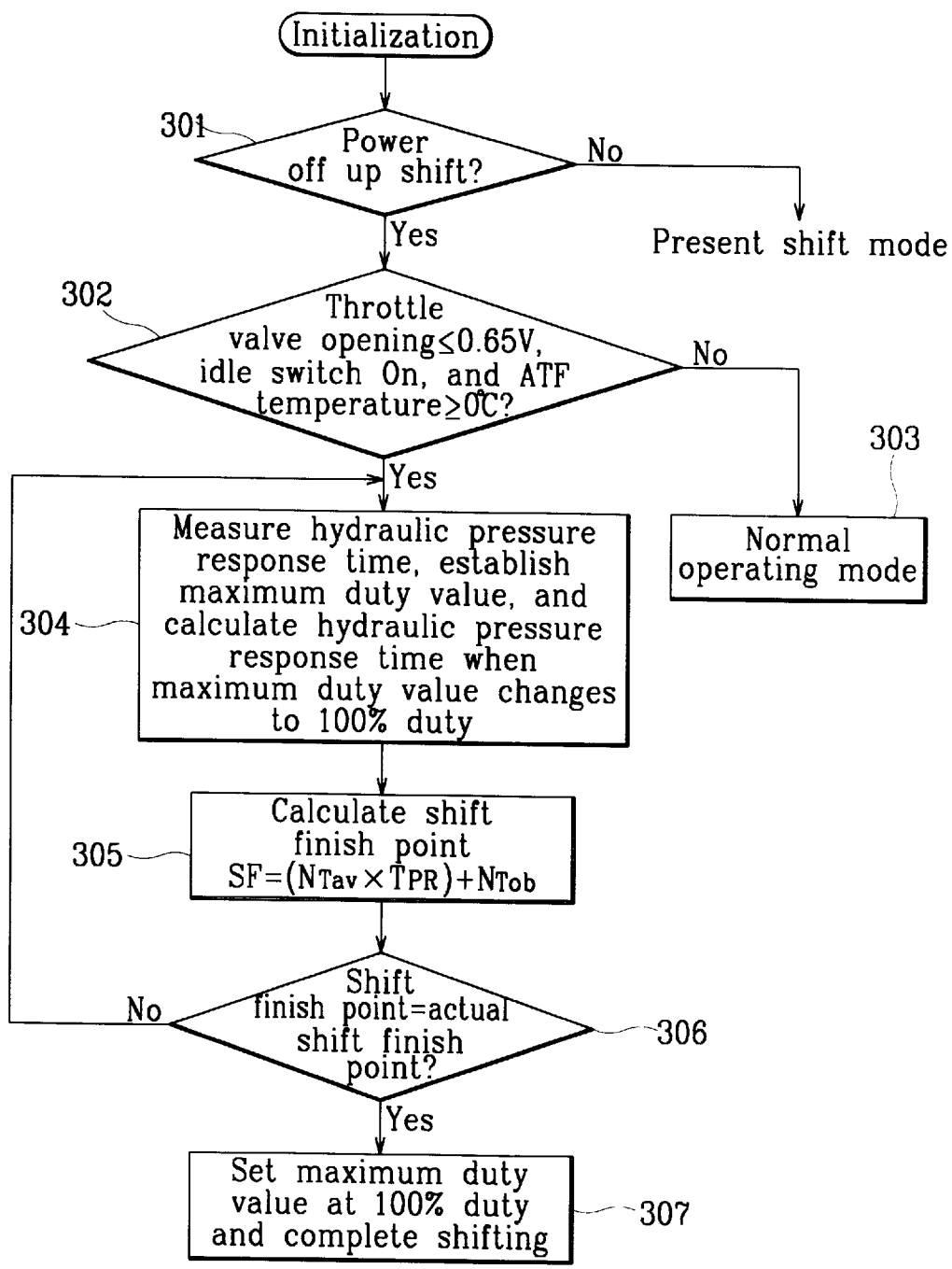
FIG. 3 is a flow chart of an upshift control method according to a preferred embodiment of the present invention.
Figure 4:
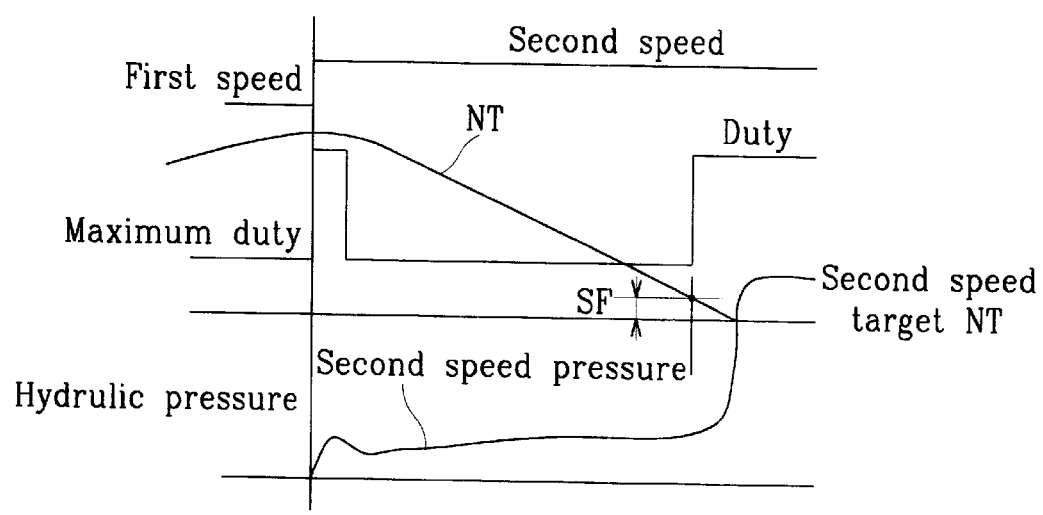
FIG. 4 is a shift pattern diagram for the upshift control method of the present invention.

FIG. 3 shows a flow chart of an upshift control method according to a preferred embodiment of the present invention.

First, it is determined during an upshift operation, if power Off upshifting is taking place in step S301. If power Off upshifting is being performed, it is determined if throttle valve opening is less than or equal to 0.65V, if an idle switch is On, and if an ATF temperature is greater than or equal to 0° C. in step S302. If the conditions of step S302 are not satisfied, the upshift control method is placed in a normal operating mode in step S303 (i.e., the shift finish point is not altered according to turbine rpm). If the conditions of step S302 are met, however, a hydraulic pressure response time is measured and a maximum duty value for preventing forced shifting is established, and the hydraulic pressure response time is calculated when the maximum duty value changes to 100% duty in step S304.

Next, the shift finish point is calculated in step S305. Following the calculation of the shift finish point, it is determined if the shift finish point corresponds to an actual shift finish point in step S306. If the shift finish point does not correspond to the actual shift finish point, the process is returned to step S304. However, if the shift finish point corresponds to the actual shift finish point, the maximum duty value is set at 100% duty and shifting is completed in step S307.

In the method of the present invention as described above, if the accelerator pedal is released by the driver in a state where the same is depressed to a large degree (i.e., from a state of large throttle valve opening), engine rpm are reduced to a level roughly corresponding to turbine rpm, and turbine rpm are synchronized at the shift finish point to complete shifting. However, if a reduction in turbine rpm occurs too quickly during power Off upshifting as a result of changes in engine rpm reduction characteristics, under shooting occurs, whereas tie-up occurs if the reduction in turbine rpm occurs too slowly. The problems of under shooting and tie-up worsen as a result of either too slow or fast hydraulic pressure response times.

Accordingly, the shift controller 20 determines, during an upshift operation, if power Off upshifting is taking place in step S301. If power Off upshifting is not being performed, shifting is performed according to whether various predetermined criteria are met, whereas if it is determined that power Off upshifting is being performed, the shift controller 20 determines if throttle valve opening is less than or equal to 0.65V using signals received from the throttle valve opening sensor 11 or by determining if an idle switch is On, and also determines if an ATF temperature is greater than or equal to 0° C. by signals received from the ATF temperature sensor 14 in step S302.

If the conditions of step S302 are not satisfied, the upshift control method is placed in a normal operating mode in step S303 (i.e., a shift finish point is not altered according to turbine rpm). However, if the conditions of step S302 are met, the hydraulic pressure response time is measured and the maximum duty value for preventing forced shifting is established. At this time, a return spring force of when a clutch is fully engaged is obtained, and hydraulic pressure is established at a level where the force of the return spring is at a level of 80% such that the maximum duty value is set. Next, at the time where the maximum duty value is changed to 100% duty, the hydraulic pressure response time is calculated in step S304.

Subsequently, the shift finish point SFP is calculated in step S305. This is performed by detecting turbine rpm Nt for each cycle (20 ms) for four cycles to determine a rate of change of turbine rpm (NT1–NT4). This rate of change of turbine rpm (NT1–NT4) is divided by four cycles to obtain an average turbine rpm rate of change NTAV. Next, the shift controller 20 determines a target turbine rpm NTob, the target turbine rpm NTob being calculated by multiplying No by a target gear ratio (NTob=No×target gear ratio), where No is a turbine input rpm Nt divided by the gear ratio. If the target turbine rpm NTob are calculated, the shift controller 20 determines the shift finish point. That is, the shift finish point equals the average turbine rpm NTAV times the hydraulic pressure response time TPR plus the tare turbine rpm NTob [i.e., (NTAV×TPR)+NTob=SFP].

Next, it is determined if the shift finish point corresponds to the actual shift finish point during power Off upshifting in step S306. If the shift finish point does not correspond to the actual shift finish point, the process is returned to step S304. However, if the shift finish point corresponds to the actual shift finish point, the maximum duty value is set at 100% duty and shifting is completed in step S307.

In the power Off upshift control method of the present invention as described above, by varying the shift finish point according to changes in turbine rpm during power Off upshifting when such a change is need, shift shock caused by under shooting and tie-up are prevented, thereby improving overall ride comfort.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A power Off upshift control method for an automatic transmission comprising the steps of:
   determining, during an upshift operation, if power Off upshifting is taking place;
   determining if power Off upshift conditions are satisfied;
   measuring a hydraulic pressure response time, establishing a maximum duty value for preventing forced shifting, and calculating the hydraulic pressure response time when the maximum duty value changes to 100% duty, these processes being performed if the power Off upshift conditions are satisfied;

calculating a shift finish point after the hydraulic pressure response time is calculated;

determining if the shift finish point corresponds to an actual shift finish point; and setting the maximum duty value at 100% duty if the shift finish point corresponds to the actual shift finish point.

2. The method of claim 1 wherein the power Off upshift conditions include a throttle valve opening less than and/or equal to 0.65V, an idle switch being in an On state, and an ATF temperature being greater than or equal to 0° C.

3. The method of claim 1 wherein if the power Off upshift conditions are not satisfied, the upshift control method is placed in a normal operating mode such that the shift finish point is not altered according to turbine rpm.

4. The method of claim 1 wherein the shift finish point is calculated by detecting turbine rpm Nt for a predetermined number of cycles to obtain an average turbine rpm rate of change NTAV; calculating a target turbine rpm NTob, the target turbine rpm NTob being calculated by multiplying No by a target gear ratio (NTob=No×target gear ratio), where No is a turbine input rpm Nt divided by the gear ratio; and determining the shift finish point by multiplying the average turbine rpm NTAV by the hydraulic pressure response time TPR plus the target turbine rpm NTob [i.e., (NTAV×TPR)+ NTob=SFP].

5. The method of claim 4 wherein the average turbine rpm rate of change NTAV is obtained by detecting turbine rpm Nt for each cycle (20 ms) for four cycles to determine a rate of change of turbine rpm (NT1–NT4), then dividing this rate of change of turbine rpm (NT1–NT4) by four cycles to obtain the average turbine rpm rate of change NTAV.

* * * * *